US008338801B2

(12) United States Patent
Ishiwata et al.

(10) Patent No.: US 8,338,801 B2
(45) Date of Patent: Dec. 25, 2012

(54) LIGHTING SYSTEM FOR PREVENTING PLANT DISEASE DAMAGE

(75) Inventors: Masaki Ishiwata, Kadoma (JP); Makoto Yamada, Kadoma (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/063,341

(22) PCT Filed: Oct. 16, 2009

(86) PCT No.: PCT/JP2009/067895
§ 371 (c)(1),
(2), (4) Date: Mar. 10, 2011

(87) PCT Pub. No.: WO2010/047277
PCT Pub. Date: Apr. 29, 2010

(65) Prior Publication Data
US 2011/0163246 A1 Jul. 7, 2011

(30) Foreign Application Priority Data

Oct. 20, 2008 (JP) .................................. 2008-269896

(51) Int. Cl.
*G21K 5/00* (2006.01)
*A61N 5/00* (2006.01)
*A61N 5/06* (2006.01)

(52) U.S. Cl. .............. 250/492.1; 250/494.1; 250/504 R; 47/17; 47/58.1 LS

(58) Field of Classification Search ............... 250/492.1, 250/493.1, 494.1, 504 R, 526; 47/17, 58.1 R, 47/58.1 LS, 60
See application file for complete search history.

(56) References Cited

U.S. PATENT DOCUMENTS 4,506,474 A * 3/1985 Kadkade et al. ........... 47/58.1 R
(Continued)

FOREIGN PATENT DOCUMENTS
JP 2003-339236 12/2003
(Continued)

OTHER PUBLICATIONS

Xu Jingzhi et al., "Study Advances on Selective Absorption to Light Wavalengths in the Development of Plants ", Hebei Journal of Forestry and Orchard Research, Jun. 2002, 17(2), pp. 180-184, with English language translation.

*Primary Examiner* — Bernard E Souw
(74) *Attorney, Agent, or Firm* — Greenblum & Bernstein, P.L.C.

(57) ABSTRACT

A lighting system for preventing a plant disease damage is provided with an ultraviolet light source which emits ultraviolet ray including UV-B in a wavelength region of 255 to 340 nm, a visible light source which emits visible light, and controllers which control a lighting of the ultraviolet light source and the visible light source. The controller controls the lighting of the ultraviolet light source so that a horizontal irradiance on a canopy surface of a plant is 50 $\mu W/cm^2$ or less during a predetermined daytime period. The controller controls the lighting of the visible light source so that a horizontal illuminance on a canopy surface of a plant is 10 lux or less during a predetermined nighttime period. The lighting system promotes a component change of the plant effectively by a stimulation by the UV-B irradiation and the prolonged irradiation time of the visible light which is associated with a vegetative growth, so that a nutritional component of the plant can stably be increased. Moreover, the lighting of the ultraviolet light source and the visible light source is controlled by the controllers, thus a user effort is reduced and efficiency is achieved.

10 Claims, 2 Drawing Sheets

U.S. PATENT DOCUMENTS

| | | | |
|---|---|---|---|
| 4,724,633 A * | 2/1988 | Kadkade | 47/58.1 R |
| 4,788,793 A * | 12/1988 | Kadkade | 47/58.1 R |
| 4,819,373 A * | 4/1989 | Kadkade | 47/58.1 R |
| 4,897,957 A * | 2/1990 | Oglevee et al. | 47/58.1 R |
| 7,774,979 B2 * | 8/2010 | Hurst | 47/58.1 LS |
| 7,905,052 B2 * | 3/2011 | Hurst et al. | 47/29.4 |
| 2010/0193707 A1 | 8/2010 | Yamada et al. | |
| 2011/0016785 A1 * | 1/2011 | Yamada et al. | 47/1.1 R |

FOREIGN PATENT DOCUMENTS

| | | |
|---|---|---|
| JP | 2005-328734 | 12/2005 |
| JP | 2006-158262 | 6/2006 |
| JP | 2007-089430 | 4/2007 |
| WO | 2009/011349 | 1/2009 |

* cited by examiner

LIGHTING SYSTEM FOR PREVENTING PLANT DISEASE DAMAGE

FIELD OF THE INVENTION

The present invention relates to a lighting system for preventing a plant disease damage of crops etc.

DESCRIPTION OF THE RELATED ART

Conventionally, there is a well known nursery plant production system in which nursery plants are placed in a space where outside light and outside air are cut off to provide an appropriate hygrothermal environment and light environment to the nursery plants and a plant growth lighting apparatus which irradiates nursery plants with ultraviolet B (UV-B) to suppress a generation of algae and molds on a culture medium in a protected cultivation such as an agricultural greenhouse or glasshouse or an outdoor cultivation (refer to Japanese Laid-Open Patent Publication No. 2005-328734, for example).

It is well known that the UV-B irradiation to the plant is effective in preventing a plant disease damage and further causes a secondary effect of increasing a sugar content and enhancing a color of the plant. However, a component change in the plant is unstable.

DISCLOSURE OF THE INVENTION

In order to solve the problem of the conventional art described above, an object of the present invention is to provide a lighting system for preventing a plant disease damage which increases a nutritional component of a plant stably by promoting a component change of the plant effectively.

A lighting system for preventing a plant disease damage according to an aspect of the present invention has an ultraviolet light source which emits ultraviolet ray including UV-B in a wavelength region of 255 to 340 nm, a visible light source which emits visible light, and controllers which control a lighting of the ultraviolet light source and the visible light source, wherein the controllers control the lighting of the ultraviolet light source so that a horizontal irradiance on a canopy surface of a plant is 50 $\mu W/cm^2$ or less during a predetermined daytime period and control the lighting of the visible light source so that the horizontal illuminance on a canopy surface of a plant is 10 lux or less during a predetermined nighttime period.

According to the above configuration, the component change of the plant is promoted effectively by the stimulation by the UV-B irradiation and the prolonged irradiation time of the visible light which is associated with a vegetative growth, so that a nutritional component of the plant can stably be increased. Moreover, the lighting of the ultraviolet light source and the visible light source is controlled by the controllers, thus a user effort is reduced and efficiency is achieved compared to a manual lighting control of the ultraviolet light source and the visible light source.

It is also preferable that a light source which emits a visible light in a wavelength region of 500 to 600 nm is used as the visible light source in the above system.

According to the above configuration, photonic synthesis is made more efficient, so that a nutrient of the plant can be increased effectively, and moreover, the vegetative growth can solely be promoted intensively.

It is also preferable that a light source which emits a visible light in a wavelength region of 600 to 700 nm is used in the above system.

According to the above configuration, the photonic synthesis is made more efficient, so that the nutrient of the plant can be increased effectively, and moreover, a reproductive growth of the plant can be promoted and thus a harvest time can be accelerated.

It is also preferable that a light source which emits a visible light in a wavelength region of 400 to 500 nm is used as the visible light source in the above system.

According to the above configuration, the photonic synthesis is made more efficient, so that the nutrient of the plant can be increased effectively, and moreover, a growth of plant length can be suppressed and a thickness of leaf can be made thick.

It is also preferable that the controller has a timer which prerecords data on annual sunset time and sunrise time in each area and controls the lighting to emit the visible light from sunset to sunrise each day based on the data recorded in the timer in the above system.

According to the above configuration, the visible light source emits the visible light from sunset to sunrise each day based on the data recorded in the timer. Consequently, the timer does not need to be adjusted every day, so that the user effort is reduced and the efficiency is achieved.

It is also preferable that the ultraviolet light source is provided in a housing different from a housing in which the visible light source is provided in the above system.

According to the above configuration, the ultraviolet light source can be combined with an existing lighting equipment, so that manufacturing cost can be suppressed.

DESCRIPTION OF THE PREFERRED EMBODIMENTS

Figure 1:
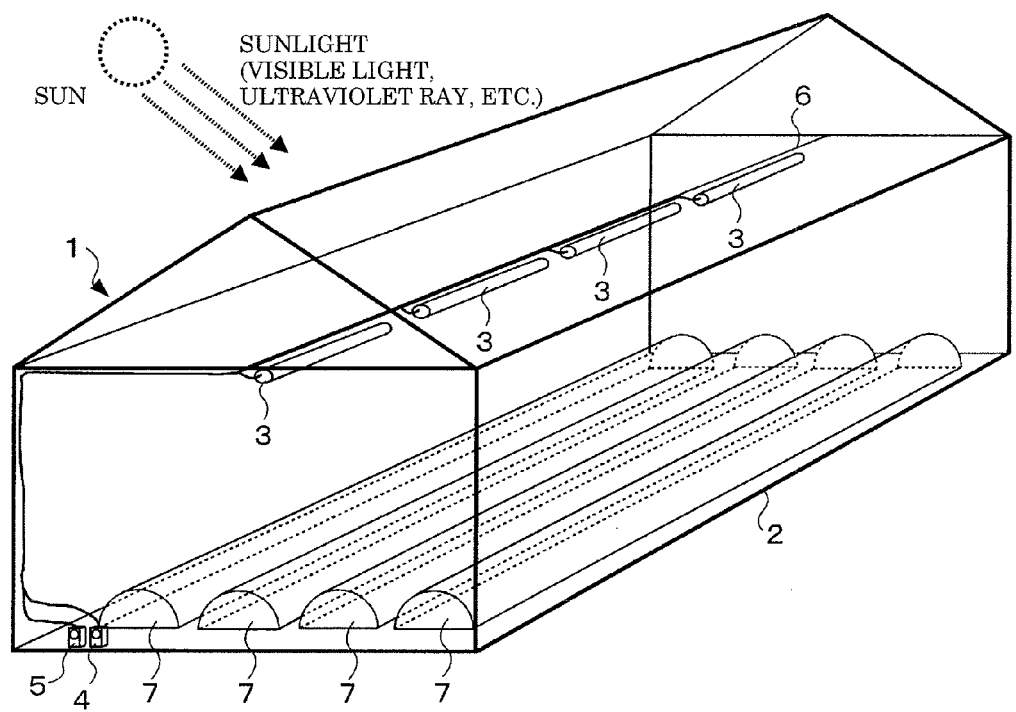
FIG. 1 is an appearance diagram of an agricultural greenhouse in which a lighting system for preventing a plant disease damage according to a preferred embodiment of the present invention is installed.

A lighting system for preventing a plant disease damage according to a preferred embodiment of the present invention (abbreviated as the lighting system hereinafter) is described with reference to FIGS. 1 to 3. FIG. 1 shows a configuration of an agricultural greenhouse 2 in which a lighting system 1 of the present preferred embodiment is installed. The lighting system 1 includes a light source 3 which emits ultraviolet ray and visible light and controllers 4 and 5 which control a lighting of the light source 3 in accordance with a type of the light. Each light source 3 is installed on a lower side of a beam 6 in the agricultural greenhouse 2 to be parallel to the beam 6 and emits the ultraviolet ray and visible light toward furrows 7.

Figure 2:
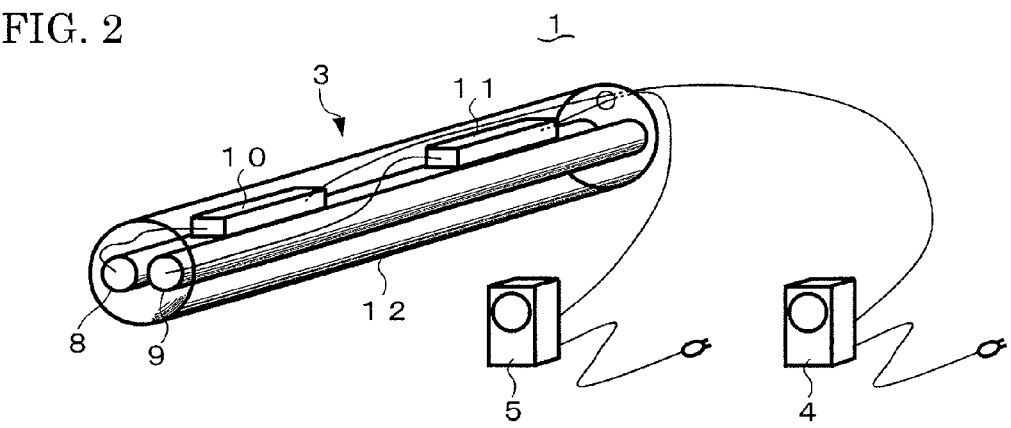
FIG. 2 is an appearance diagram of the lighting system in FIG. 1.

FIG. 2 shows a schematic view of the lighting system 1 of the present preferred embodiment. The light source 3 includes an ultraviolet light source 8 which emits the ultraviolet ray, a visible light source 9 which emits the visible light, ballasts 10 and 11 which turn on stably the ultraviolet light source 8 and the visible light source 9, a glow starter (not shown), a power circuit (not shown), and a housing 12 which stores the ultraviolet light source 8 and so on. The ultraviolet light source 8 can also be stored in a housing different from a housing in which the visible light source 9 is stored. The ultraviolet light source 8 which is stored in the different housing can be combined with an existing lighting equipment in which the visible light source 9 is stored, so that manufacturing cost can be suppressed.

The controller 4 controls a supply and cutoff of an electrical power to the ultraviolet light source 8 in twenty-four-hour cycle to turn on the ultraviolet light source 8 during a predetermined daytime period. The controller 4 also controls the ultraviolet light source 8 so that a horizontal irradiance on a canopy surface of a plant is 50 $\mu W/cm^2$ or less. The lighting control of the ultraviolet light source 8 by the controller 4 saves effort of a user and thereby is more efficient than a manual lighting control of the ultraviolet light source 8.

The controller 5 controls a supply and cutoff of an electrical power to the visible light source 9 in twenty-four-hour cycle to turn on the visible light source 9 during a predetermined nighttime period. The controller 5 also controls the visible light source 9 so that a horizontal illuminance on a canopy surface of a plant is 10 lux or less. The lighting control of the visible light source 9 by the controller 5 saves effort of a user and thereby is more efficient than a manual lighting control of the visible light source 9.

It is preferable that the controller 5 has a timer (not shown) which prerecords data on annual sunset time and sunrise time in each area and controls the lighting of the visible light source 9 based on the data recorded in the timer. When the data is recorded in the timer of the controller 5, the visible light source 9 emits the visible light from sunset to sunrise each day recorded in the timer. Consequently, the controller 5 does not need to be adjusted every day, so that the user effort is reduced and the efficiency is achieved.

The ultraviolet light source 8 emits the ultraviolet ray including UV-B in a wavelength range of 255 to 340 nm. A fluorescent light, a compact fluorescent, a cold cathode fluorescent light, a xenon lamp, a high-intensity discharge lamp, a light emitting diode (LED), and an organic EL, for example, can be used as the ultraviolet light source 8.

The visible light source 9 emits the visible light including a light in a wavelength range of 380 to 780 nm. In the same manner as the ultraviolet light source 8, a fluorescent light, a compact fluorescent, a cold cathode fluorescent light, a xenon lamp, a high-intensity discharge lamp, a light emitting diode (LED), and an organic EL, for example, can be used as the visible light source 9. It is also applicable that the visible light source 9 emits the visible light in a wavelength range of 400 to 500 inn, 500 to 600 nm, or 600 to 700 nm in accordance with a stage of plant growth.

According to the lighting system 1 of the present preferred embodiment, the visible light source 9 emits a green visible light in the wavelength range of 500 to 600 nm, so that photonic synthesis is made more efficient and a nutrient of the plant can be increased effectively, and moreover, a vegetative growth can solely be promoted intensively.

According to the lighting system 1 of the present preferred embodiment, the visible light source 9 emits a red visible light in the wavelength range of 600 to 700 nm, so that the photonic synthesis is made more efficient and the nutrient of the plant can be increased effectively, and moreover, a reproductive growth of the plant such as a flower-bud formation can be promoted and a harvest time can be accelerated purposefully. The visible light in the wavelength range of 600 to 700 nm is the most efficient in the light in the wavelength range of 380 to 780 nm for the photonic synthesis of the plant.

According to the lighting system 1 of the present preferred embodiment, the visible light source 9 emits a blue visible light in the wavelength range of 400 to 500 nm, so that the photonic synthesis is made more efficient and the nutrient of the plant can be increased effectively, and moreover, a growth of plant length can be suppressed and a thickness of leaf can be made thick. Since the lighting system 1 turns on the visible light source 9 during a nighttime period when a light sensitivity of the plant increases, the plant length can be suppressed even when a horizontal illuminance of the visible light is low, that is, 10 lux or less. In order to increase a use efficiency of a space in the greenhouse culture, a plant which is originally short in height or a plant whose height is purposefully made short is cultivated by using a multistage culture bench with two or more tieres. When cultivating the latter plant whose height is purposefully made short, the suppression of the plant length is efficient.

Figure 3:
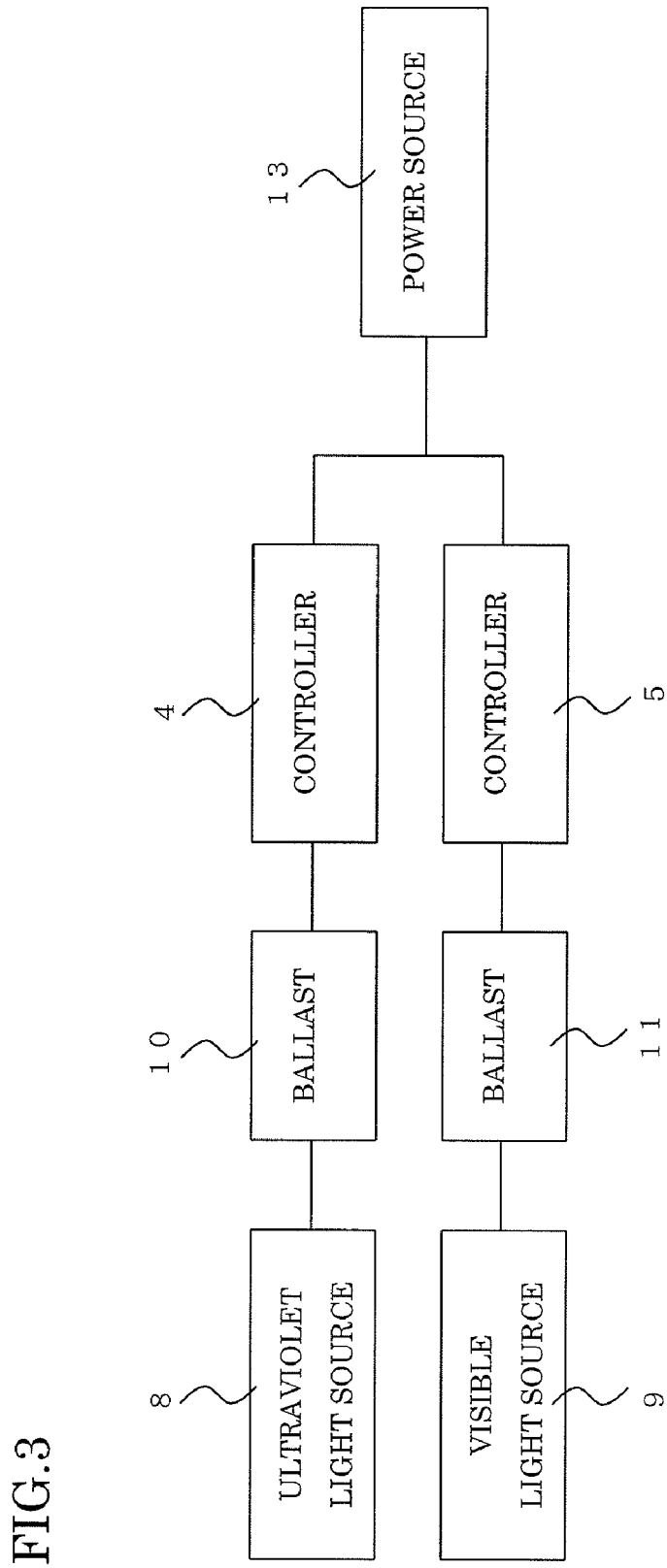
FIG. 3 is a block diagram showing an electrical configuration of the lighting system in FIG. 1.

FIG. 3 shows an electrical configuration of the lighting system 1. In the lighting system 1, a power source 13 which supplies a lighting power, the controller 4, the ballast 10, and the ultraviolet light source 8 are connected in sequence, and the power source 13, the controller 5, the ballast 11, and the visible light source 9 are connected in sequence. The ultraviolet light source 8 emits the ultraviolet ray including UV-B in a predetermined time stably when the power source 13 supplies the electrical power, the controller 4 controls the lighting, and the ballast 10 limits the electrical power to a defined value. In the same manner as the ultraviolet light source 8, the visible light source 9 emits the visible light a predetermined time stably when the power source 13 supplies the electrical power, the controller 5 controls the lighting, and the ballast 11 limits the electrical power to a defined value.

The plants which the light system 1 targets include all the crops which are generally cultivated by farm houses. In particular, fruit vegetables such as tomato, egg apple, cucumber, small sweet pepper, green pepper, melon, watermelon, and strawberry, for example, leaf vegetables such as lettuce, cabbage, Chinese cabbage, qing-geng-cai, spinach, komatsuna, and Japanese basil, for example, root vegetables such as burdock root, Japanese radish, and carrot, for example, beans such as soybean, green soybean, broad bean, and pea, for example, flowers and ornamental plants such as chrysanth, rose, Turkish bellflower, carnation, and celosia, for example, and rice plant and tea plant as other example are cited as the plants which the light system 1 targets.

Each plant can be cultivated in any of the outdoor, a plastic greenhouse and glass greenhouse cultivations. Moreover, a ridge whose shape is common in an open field, a ridge which is formed of mounds on a metal or wooden culture bench, and a pot or planter which is placed on the culture bench, for example, are cited as a culture medium to cultivate the plants.

Here, a principle of preventing a plant disease damage by ultraviolet irradiation is described. The disease damage is prevented by emitting UV-B to the plant based on the following two principles.

One principle for preventing a plant disease damage is that a resistance of the plant itself to the disease damage is enhanced. Normally, when the plant is infected with fungi which cause a disease, an induced resistance to the disease-causing fungi, that is to say, a plant immunity system is set into motion as a protective response to the fungi. In this system, when a part of plant tissue is subject to an external factor (stress) such as an infection by the disease-causing fungi, for example, a signal material is released from the infected area, and the signal material goes through the plant, reaches an area which is not infected yet, and induces a gene expression which relates to the resistance expression. PR-protein (pathogenesis-related protein) having a resistance activity such as glucanase and chitinase which are enzymes to lyse a cell wall of the disease-causing fungi and phytoalexin which is toxic to the disease-causing fungi (an antibacterial activity material and a feed aversion activity material), for example, are cited as the material which relates to the resistance expression. In case of the present invention, the ultraviolet ray including UV-B which is a light stimulation is emitted to the plant as the external factor (stress) so that the gene expression which relates to the disease damage resistance is induced.

The other principle for preventing a plant disease damage is that filamentous fungi which cause a plant disease damage is subjected to an action directly so that a hyphal growth is suppressed to prevent spread of the disease. The filamentous fungi include fungi which cause powdery mildew, gray mold, anthracnose, downy mildew, and sooty mold, for example. In Japanese Laid-Open Patent Publication No. 2005-328734, there is a description that a generation of mold is suppressed by emitting ultraviolet ray whose UV-B irradiance is 50 $\mu W/cm^2$ or less to a plant to prevent a leaf scorch. Moreover, it is confirmed in a laboratory experiment by the present inventor that when UV-B of 5 to 50 $\mu W/cm^2$ is emitted to the fungi of gray mold and anthracnose which are inoculated on an agar medium, the hyphal growth is suppressed afterwards (a size of fungi colony does not change even after cultivating in a constant temperature chamber for one week).

An operation procedure of the lighting system 1 having the above configuration is described below.

Procedure 1: In a space where the plant is cultivated such as the agricultural greenhouse 2, the light source 3 is installed above or on the side of a plant body. At this time, the light source 3 is installed in a position to allow the horizontal irradiance of UV-B on the canopy surface which is an imaginary phase near a growing point (a point where a new leaf or bud comes out) which is placed on a top of the plant body in height to be 50 $\mu W/cm^2$ or less and the horizontal illuminance of the visible light on the canopy surface to be 10 lux or less. The light source 3 is installed in the position to allow the horizontal irradiance of UV-B to be 50 $\mu W/cm^2$ or less by reason that a risk of causing the leaf scorch of the plant increases dramatically when the horizontal irradiance of UV-B exceeds 50 $\mu W/cm^2$. The horizontal irradiance of UV-B and the horizontal illuminance of the visible light are measured under a condition that a light receiving portion of a measuring device is directed upward and the measuring device is installed on the canopy surface of the plant.

In particular, the light source 3 is installed on a lower side of the beam 6 which is located approximately two meters above a furrow surface of the furrow 7 in the agricultural greenhouse 2 to be parallel to the beam 6, for example. A 20-watt fluorescent type equipment, for example, is used for the ultraviolet light source 8 and the visible light source 9 of the light source 3. When the plural light sources 3 are installed and then UV-B does not come to a predetermined horizontal irradiance in an identical height or the visible light does not come to a predetermined horizontal illuminance in an identical height due to a difference of output from each light source 3, the horizontal irradiance and the horizontal illuminance are adjusted by using a light control device or a dark filter, for example.

Procedure 2: Concerning an irradiation time of ultraviolet ray emitted to the canopy surface of the plant on the furrow 7 and the culture bench, the risk of causing the leaf scorch of the plant increases dramatically when an accumulated ultraviolet intensity per day is higher than 10 $kJ/m^2$. Accordingly, the controller 4 is set in a way that the accumulated ultraviolet intensity per day is 10 $kJ/m^2$ or less. In particular, the controller 4 is set to turn on the ultraviolet light source 8 around 9 o'clock in the morning and turn off the ultraviolet light source 8 around 3 o'clock in the afternoon, for example. The controller 5 is set to turn on the visible light source 9 after sunset and turn off the visible light source 9 at sunrise, for example.

Procedure 3: The ultraviolet light source 8 is turned on around 9 o'clock in the morning and turned off around 3 o'clock in the afternoon under control of the controller 4. After the ultraviolet light source 8 is turned off, the ultraviolet light source 8 and the visible light source 9 continue to be turned off until sunset.

Procedure 4: The visible light source 9 is turned on after sunset and turned off at sunrise the next day under control of the controller 5. After the visible light source 9 is turned off, the ultraviolet light source 8 and the visible light source 9 continue to be turned off until around 9 o'clock in the morning.

Procedure 5: After 9 o'clock in the morning, the procedures 3 and 4 are repeated.

According to the lighting system 1 of the present preferred embodiment, a component change of the plant is promoted effectively by the stimulation by the UV-B irradiation during the daytime period and the prolonged irradiation time of the visible light which is associated with the vegetative growth during the nighttime period, so that the nutritional component of the plant can stably be increased.

There is a possibility that the visible light source 9 is not continuously turned on during the nighttime period after sunset from a standpoint of energy saving. In particular, for example, the visible light source 9 is repeatedly turned off for a predetermined period of time after being turned on for a predetermined period of time, or the visible light source 9 is turned off for a few hours at one time in the nighttime. The plant generally determines the night in accordance with a continuity of dark period. Thus, there is relatively little influence of turning off the light for a short time in the nighttime on a day-length response of the plant. Moreover, the lighting-up even for a short time in the nighttime has an effect of prolong the day-length, so that it is of advantage in cultivating a long-day plant which bears flowers when the day-length lengthens than in cultivating a short-day plant which bears flowers when the day-length shortens.

The present invention is not limited to the configuration of the above preferred embodiment, however, various modification are applicable in accordance with the intended use. For example, there is a possibility that UV-B causes damage to a human body, thus, it is also preferable that the ultraviolet light source including UV-B is turned on by using a human detection sensor switch only when a worker is not in the agricultural greenhouse to enable a safety ensuring of the worker in the agricultural greenhouse.

The present invention is based on Japanese Patent Application No. 2008-269896, and as a result, the subject matter is to be combined with the present invention with reference to the specification and drawings of the above patent application.

Although the present invention is fully described by the preferred embodiments with reference to the accompanying drawings, it is clear to the person having ordinary skill in the art that the various changes and modifications are applicable. Consequently, such changes and modifications do not depart from the scope of the present invention but are to be included in the scope of the present invention.

What is claimed is:

1. A lighting system for preventing a plant disease damage, comprising:
   an ultraviolet light source which emits ultraviolet ray including UV-B in a wavelength region of 255 to 340 nm;

a visible light source which emits visible light; and
controllers which control a lighting of the ultraviolet light source and the visible light source, wherein
one of the controllers controls the lighting of the ultraviolet light source so that a horizontal irradiance on a canopy surface of a plant is 50 μW/cm² or less during a predetermined daytime period and an accumulated ultraviolet intensity per day is limited to 10 kJ/m² or less, and
the other controller controls the lighting of the visible light source so that the horizontal illuminance on a canopy surface of a plant is 10 lux or less during a predetermined nighttime period.

2. The lighting system for preventing a plant disease damage according to claim 1, wherein a light source which emits a visible light in a wavelength region of 500 to 600 nm is used as the visible light source.

3. The lighting system for preventing a plant disease damage according to claim 1, wherein a light source which emits a visible light in a wavelength region of 600 to 700 nm is used as the visible light source.

4. The lighting system for preventing a plant disease damage according to claim 1, wherein a light source which emits a visible light in a wavelength region of 400 to 500 nm is used as the visible light source.

5. The lighting system for preventing a plant disease damage according to claim 1, wherein the controller has a timer which prerecords data on annual sunset time and sunrise time in each area and controls the lighting to emit the visible light from sunset to sunrise each day based on the data recorded in the timer.

6. The lighting system for preventing a plant disease damage according to claim 1, wherein the ultraviolet light source is provided in a housing different from a housing in which the visible light source is provided.

7. The lighting system for preventing a plant disease damage according to claim 2, wherein the ultraviolet light source is provided in a housing different from a housing in which the visible light source is provided.

8. The lighting system for preventing a plant disease damage according to claim 3, wherein the ultraviolet light source is provided in a housing different from a housing in which the visible light source is provided.

9. The lighting system for preventing a plant disease damage according to claim 4, wherein the ultraviolet light source is provided in a housing different from a housing in which the visible light source is provided.

10. The lighting system for preventing a plant disease damage according to claim 5, wherein the ultraviolet light source is provided in a housing different from a housing in which the visible light source is provided.

* * * * *